Nov. 12, 1963 W. A. KLUCK 3,110,888

MAGNETIC SWITCHING CORE MATRICES

Filed Sept. 1, 1959 4 Sheets-Sheet 1

INVENTOR
Wallace A. Kluck

BY Stevens, Davis, Miller & Mosher
ATTORNEYS

Nov. 12, 1963 W. A. KLUCK 3,110,888

MAGNETIC SWITCHING CORE MATRICES

Filed Sept. 1, 1959 4 Sheets-Sheet 2

INVENTOR

Wallace A. Kluck

BY Stevens, Davis, Miller & Mosher

ATTORNEYS

Nov. 12, 1963 W. A. KLUCK 3,110,888

MAGNETIC SWITCHING CORE MATRICES

Filed Sept. 1, 1959 4 Sheets-Sheet 3

INVENTOR
Wallace A. Kluck

BY Stevens, Davis, Miller & Mosher
ATTORNEYS

Nov. 12, 1963 W. A. KLUCK 3,110,888

MAGNETIC SWITCHING CORE MATRICES

Filed Sept. 1, 1959 4 Sheets-Sheet 4

INVENTOR
Wallace A. Kluck

BY Stevens, Davis, Miller & Mosher
ATTORNEYS

United States Patent Office 3,110,888

Patented Nov. 12, 1963

3,110,888

MAGNETIC SWITCHING CORE MATRICES

Wallace A. Kluck, Dallas, Tex., assignor to Texas Instruments Incorporated, Dallas, Tex., a corporation of Delaware Filed Sept. 1, 1959, Ser. No. 837,460

9 Claims. (Cl. 340—174)

This invention relates to magnetic switching core matrices of the type designed to select a single magnetic core from a multiplicity of magnetic cores and to cause an output signal to be generated in an output winding on the selected core.

Magnetic switching core matrices are primarily used in digital computers in conjunction with storage core matrices, which store digital data for the computers to operate upon. These storage core matrices have a large number of inputs. To store data in or read data out of a storage core matrix, current pulses having specific shapes and time relationships must be applied to selected inputs of the storage core matrix. Magnetic switching core matrices serve the function of selecting the inputs of the storage core matrices and applying current pulses having the necessary shapes and time relationships to the selected inputs.

The magnetic switching core matrix comprises a multiplicity of magnetic cores, which exhibit rectangular hysteresis characteristics and thus have two stable states of magnetization. Circuit means are provided inductively opposite state. This switching will induce an output linking these cores in the matrix. These circuit means will select one of the cores and cause it to switch to its pulse in an output winding on the selected core. When the selected core is switched back again to its initial state by means provided for that purpose, another pulse will be generated in the output winding of the selected core. These output pulses will have the predetermined desired shape and time relationship. Thus the matrix comprises a means to select one of a multiplicity of outputs and to generate output pulses having a predetermined shape and time relationship from the selected output. In the operation of the magnetic switching core matrices of the prior art, coincidence currents are used to carry out the selection of a core. In this coincidence current system of selection, the selected core will receive sufficient M.M.F. from a coincidence of currents applied to different windings of the selected core to cause it to switch states. Other cores in the matrix besides the selected core will also receive M.M.F. in a direction to cause switching, but these other cores will receive insufficient M.M.F. to cause them to switch. These insufficient M.M.F.'s are called half currents. These half currents are undesirable because they limit the amount of M.M.F. which may be applied to the selected core and thus limit the minimum switching time for a matrix. Half currents sometimes also cause the switching of an unselected core, thus causing output signals to be generated from the wrong output. In order to minimize this malfunctioning, the matrices of the prior art make use of core material, the hysteresis characteristics of which are very rectangular.

In the operation of the switching core matrices of the prior art. the necessary power to cause the switching of a selected core is usually divided between two drivers. Thus, each driver must be capable of supplying half the power to switch one of the cores from one state to the other. This high power requirement for each of the drivers is particularly undesirable because it makes it difficult to transistorize the drivers and therefore vacuum tubes are usually used for this purpose.

In the copending application of Wallace Kluck entitled Switching Core Matrix, filed September 1, 1959, Serial No. 837,408, and assigned to the assignee of the present invention, a switching matrix system is disclosed in which all half currents are eliminated and in which the power requirements for the drivers are reduced. In this copending application, however, the power to switch the selected core back to its initial state must be supplied by a single driver and therefore the driver used for this purpose must be capable of supplying all of the power to switch a core from one state to the other. The matrices of the present invention improve over the system of the aforementioned copending application in that the need for drivers capable of supplying relatively large amounts of power is eliminated, and thus the transistorizing of the entire system is facilitated. In the system of this invention, the power to switch the selected core back to its initial state is divided among several of the same drivers which are used to select and switch the selected core from its initial state to its opposite state. Thus, no driver in the system has the high power requirement of having to supply power to switch the selected core alone. This improvement is made possible by a unique winding arrangement which is described in more detail below.

It is therefore one object of this invention to provide a unique method for switching and resetting selected cores of a switching matrix.

A further object of this invention is to provide a switching matrix which utilizes parallel operation of the drivers for selectively switching and resetting the individual elements of a switching matrix.

Still another object of this invention is to provide a switching matrix which will selectively switch and reset the matrix elements without the use of half-currents.

Further objects and advantages of the present invention will become more readily apparent as the following detailed description of the preferred embodiment of the invention unfolds and when taken in conjunction with the attached drawings wherein.

Figure 1:
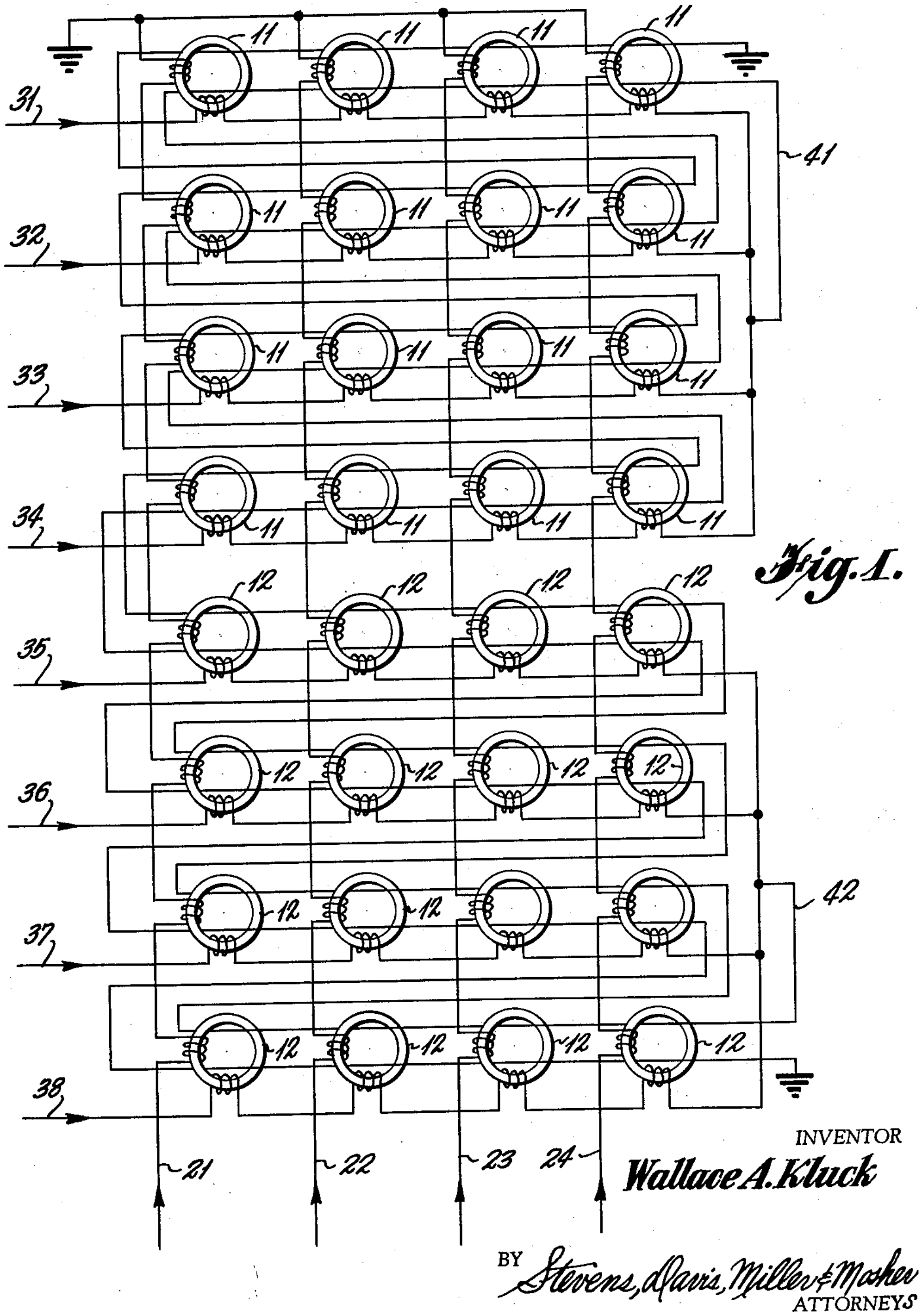
FIGURE 1 shows the circuit of one of the matrices of the invention.

Each of the three matrices of the invention disclosed herein comprises a multiplicity of magnetic cores each of which exhibits a rectangular hysteresis characteristic. Each of the magnetic cores therefore has two stable states of magnetization. The function of the matrices is to select one of the cores and switch the selected core to its opposite state without affecting the magnetic states of any of the other cores. Each of the cores of the matrices has an output winding, not shown in the drawings, wound thereon and provided for the purpose of generating the output signals from the matrix. When the selected core is switched from one state to the other it will induce an output pulse in its output winding. In this manner the matrix selects an output from a multiplicity of outputs and generates an output signal from the selected output. The matrices all have a plurality of row coils and column coils which are inductively coupled to the cores of the matrix. Currents are applied to the row and column coils by drivers. There is a different driver, not shown in the drawings, for each row coil and for each column coil.

In the description of the matrices, the two states of each core shall be referred to as the plus state and the minus state. M.M.F. applied to a core in the direction to switch the core to its plus state shall be referred to as being in the plus direction and designated by the plus symbol (+) and M.M.F. in the direction to switch a core to its minus state shall be referred to as being in the minus direction and designated by the minus symbol (−).

The switching core matrix shown in FIGURE 1 comprises 32 magnetic cores, half of which are designated by the number 11 and the other half by the number 12. The cores are arranged into four columns and eight rows. Four column coils 21–24 are provided, each of which is inductively coupled to all of the cores of a different row. Each of the column coils is inductively coupled to four of the cores 11 and four of the cores 12. The column coils 21–24 are inductively coupled to the cores by means of windings each having three turns. The column coils 21–24 are connected together at one end to a reference potential, which is ground. Eight row coils 31–38 are provided each inductively coupled to all of the cores of a different column. The row coils 31–34 are inductively coupled to the cores 11 exclusively, and the row coils 35–38 are inductively coupled to the cores 12 exclusively. The row coils are inductively coupled to the cores by means of windings each having three turns. The row coils 31–34 are connected together at one end and to a common coil 41. The common coil 41 is inductively coupled to each of the cores in the matrix with a single turn. The row coils 35, 36, 37 and 38 are all connected together at one end and to a common coil 42, which is inductively coupled to all of the cores of the matrix with a single turn. The common coils 41 and 42 are connected to ground at their other ends. The windings by which the row coils 31–38 and the column coils 21–24 are inductively coupled to the cores have polarities such that when positive currents are applied thereto, the windings will induce M.M.F. in the cores 11 in the minus direction. The common coil 41 has a polarity to induce M.M.F. in the cores 11 in the plus direction and in the cores 12 in the minus direction, when positive current flows from the common connection of the row coils 31–34 through the common coil 41 to ground. The common coil 42 has a polarity to induce M.M.F. in the cores 12 in the plus direction and in the cores 11 in the minus direction, when positive current flows from the common connection of the row coils 35–38 through the common coil 42 to ground.

In operation all of the cores start out in their minus states. The matrix functions to select one of the cores to switch the selected core from its minus state to its plus state and then to switch the selected core back to its minus state. Positive driving currents having equal amplitudes are simultaneously applied to all but one of the column coils and either all but one of the row coils 31–34 or all but one of the row coils 35–38, depending upon whether the selected core is a core 11 or a core 12. If the selected core is a core 11, then the driving currents will be applied to three of the row coils 31–34 and if the selected core is a core 12, then the driving currents will be applied to three of the row coils 35–38. The selected core will be that core which is linked by the column and row coils to which no driving currents are applied in the selected exclusive group of cores. If the selected core is a core 11, the driving currents applied to the three of the row coils 31–34 will combine into a single current flowing through the common coil 41 to ground. If the selected core is a core 12, driving currents will be applied to three of the row driving coils 35–38 and three of the column driving coils 21–24. The driving currents applied to the three of the four row coils 35–38 will combine into a single current flowing through the common coil 42 to ground. These combined currents which flow through the common coils 41 and 42 will have an amplitude of three times the driving current. This action will cause the selected core to be switched to its plus state. If the selected core is a core 11, then it will be that core 11 at the intersection of column coil and the one of the row coils 31–34 to which no driving currents are applied. If the selected core is a core 12, then it will be that core at the intersection of the column coil and the one of the row coils 35–38 to which no driving currents are applied.

No core in the matrix, other than the selected core, will receive M.M.F. in the plus direction. Thus there are no half currents applied to any of the cores in the matrix. The power to switch the selected core to its plus state will be divided among three of the drivers for the row coils and thus each driver need only furnish only one-third of the necessary power.

To switch the selected core from its plus state back to its minus state, positive driving currents of equal amplitude are simultaneously applied to all of the column coils 21–24 and to either the four row driving coils 35–38 or the four row driving coils 31–34 depending upon whether the selected core is a core 11 or a core 12. If the selected core is a core 11, the driving currents will be applied to the row coils 35–38, and if the selected core is a core 12, the driving currents will be applied to the row coils 31–34. If the selected core is a core 11, the driving currents applied to the row coils 35–38 will combine into a current having an ampliture four times that of the driving currents. This combined current will flow through the common coil 42 to ground. If the selected core is a core 12, the driving currents applied to the row coils 31–34 will combine into a current having an amplitude four times that of the driving currents. This combined current will flow through the common coil 41 to ground. This action will result in the selected core being switched back to its minus state.

The power for switching the selected core back to its minus state is divided among one of the four drivers for the column coils 21–24 and four of the eight drivers for the row coils 31–38, and thus the need for the high power driver for switching the selected core back to its minus state is eliminated. In the operation of switching the selected core back to its minus state, none of the cores will have M.M.F. applied thereto in the plus direction and thus there are no half currents in this operation.

An example of the operation of the switching matrix of FIGURE 1 will now be described. Suppose it is desired to switch the core 11 at the intersection of the column coil 23 and the row coil 33. Positive driving currents will be simultaneously applied to the column coils 21, 22 and 24 and to the row coils 31, 32 and 34. The amplitude of these driving currents shall be designated I amperes. The cores inductively coupled to the column coils 21, 22 and 24 will therefore each receive −3I ampere turns of M.M.F. from the coils 21, 22, and 24. Likewise, the cores inductively coupled to the row coils 31, 32 and 34 will each receive −3I ampere turns of M.M.F. from the row coils 31, 32 and 34. The currents applied to the row coils 31, 32 and 34 will combine into a current having an amplitude of 3I amperes, which will flow through the common coil 41 to ground. Therefore the cores 11 will receive an M.M.F. of +3I ampere turns from the common coil 41 and the cores 12 will receive an M.M.F. of −3I ampere turns from the common coil 41. By summing the M.M.F. applied to each core by the various coils, the total M.M.F. applied to each core can be determined. The total M.M.F. applied to each core for the above example is shown in Table I in accordance with the position of the cores in the illustration of FIGURE 1.

*Table I*

| | | | |
|---|---|---|---|
| −3I | −3I | 0 | −3I |
| −3I | −3I | 0 | −3I |
| 0 | 0 | +3I | 0 |
| −3I | −3I | 0 | −3I |
| −6I | −6I | −3I | −6I |
| −6I | −6I | −3I | −6I |
| −6I | −6I | −3I | −6I |
| −6I | −6I | −3I | −6I |

From Table I it will be observed that the only core which receives M.M.F. in the plus direction is the selected core at the intersection of the row coil 33 and the column coil 23 to which no driving currents were applied. The selected core receives a total M.M.F. of +3I ampere turns, which cause the selected core to switch to its plus state. The power to switch the selected core to its plus state is divided among the drivers for the row coils 31, 32 and 34. To switch this selected core back to its minus state, positive driving currents of I amperes are simultaneously applied to the row coils 35–38 and the column coils 21–24. The row coils 35–38 will therefore apply M.M.F. of −3I ampere turns to the cores 12. All of the cores in the matrix will receive M.M.F. of −3I ampere turns from the column coils 21–24. The currents applied to the row coils 35–38 will combine and flow through the common coil 42 to ground. The common coil 42 will therefore apply M.M.F. of +4I ampere turns to the cores 12 and M.M.F. of −4I ampere turns to the cores 11. By summing the M.M.F. applied to the cores by the various windings, it will be apparent that the cores 11 will each receive a total M.M.F. of −7I ampere turns and the cores 12 will each receive an M.M.F. of −2I ampere turns. Therefore the selected core 11, receiving an M.M.F. of −7I ampere turns, will be switched back to its minus state. The power to switch the selected core back to its minus state is divided among the driver for the column coil 23 and the four drivers of the row coils 35–38.

The number of turns of the windings by which the column coils 21–24 and row coils 31–38 are inductively coupled to the cores has been described as 3 and the number of turns by which the common coils 41 and 42 are inductively coupled to the cores 11 has been described as 1, thus making a 3 to 1 ratio between these turns. For this size matrix this ratio should be at least 3 to 1 to eliminate half currents. The minimum ratio between the turns of the row coils and common coils is determined by the size of the matrix. The formula for this minimum ratio is $(M/2)-1$ to 1 in which M is the number of rows in the matrix.

Figure 2:
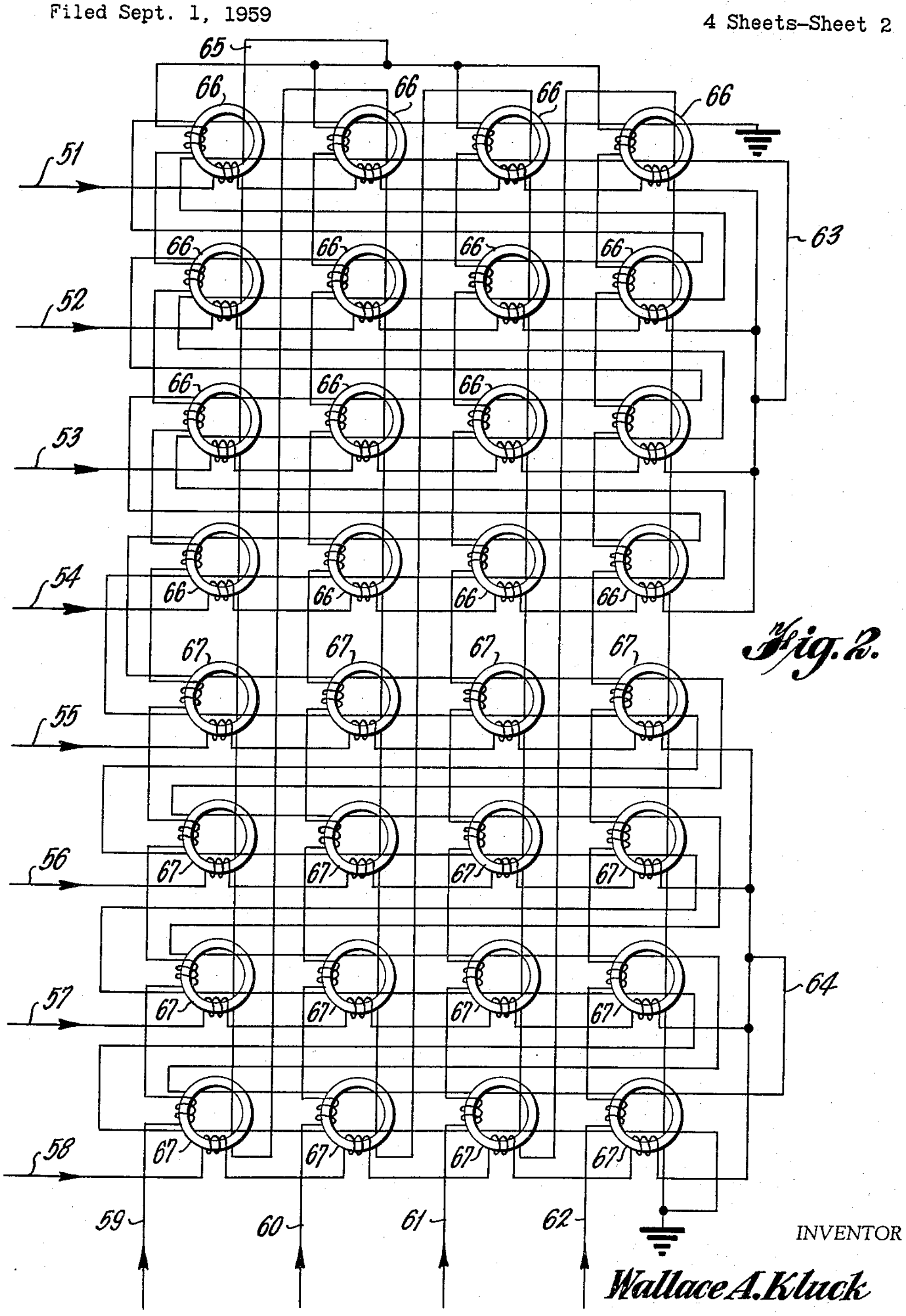
FIGURE 2 shows the circuit of a second matrix of the invention.

The matrix shown in FIGURE 2 comprises 32 cores arranged in four columns and eight rows. Four column coils 59–62 are provided, each inductively coupled to all of the cores of a different column and eight row coils 51–58 are provided, each inductively coupled to all of the cores of a different row. The row and column coils 51–62 are inductively coupled to the cores by means of windings, each having 6 turns. The column coils 59–62 are connected together at one end and to a common coil 65, which is inductively coupled to each of the cores of the matrix by a single turn. The row coils 51–54 are connected together at one end and to a common coil 63, which is inductively coupled to each of the cores of the matrix by a single turn. The row coils 55–58 are connected together at one end and to a common coil 64, which is inductively coupled to each of the cores of the matrix by a single turn. The other ends of the common coils 65, 63 and 64 are connected to ground.

The thirty-two cores of the matrix are divided into two exclusive groups of sixteen. The cores of one group are designated by the number 66 and the cores of the other group by the number 67. The row coils 51–54 are inductively coupled to the cores 66 exclusively and the row coils 55–58 are inductively coupled to the cores 67 exclusively. Each of the column coils 59–62 is inductively coupled to four cores 66 and four cores 67. The polarities of the windings by which the row and column coils 51–62 are inductively coupled to the cores are all the same and will generate M.M.F. in the minus direction when positive currents are applied to the row and column coils 51–62. The common coil 65 links the cores with a polarity such that when positive current flows from the common connection of the column coils 59–62 through the common coil 65 to ground, it will generate M.M.F. in each of the cores in the plus direction. The common coil 63 links the cores with a polarity such that when positive current flows from the common connection of the row coils 51–54 through the common coil 63 to ground, it will generate M.M.F. in the cores 66 in the plus direction and will generate M.M.F. in the cores 67 in the minus direction. The common coil 64 is linked to the cores with a polarity such that when positive current flows from the common connection of the row coils 55–58 through the coil 64 to ground, it will generate M.M.F. in the cores 67 in the plus direction and will generate M.M.F. in the cores 66 in the minus direction.

In the operation of the matrix of FIGURE 2 all of the cores start out in their minus states. The matrix functions to select one of the cores to switch the seleced core to its plus state and then to switch the selected core back to the minus state.

Positive driving currents of equal amplitude are simultaneously applied to all but one of the column coils 59–62 and either to all but one of the row coils 51–54 or to all but one of the row coils 55–58 depending upon whether the selected core is a core 66 or a core 67. If the selected core is a core 66, the driving currents are applied to three of the row coils 51–54 and if the selected core is a core 67, the driving currents are applied to three of the row coils 55–58. The driving currents applied to three of the four column coils combine into a single current which flows through the common coil 65 to ground. If the selected core is a core 66, the driving currents applied to the three of the four row coils 51–54 will combine into a single current, which will flow through the common coil 63 to ground. If the selected core is a core 67, the driving currents applied to three of the row coils 55–58 will combine and flow through the common coil 64 to ground. These combined currents flowing through the common coil 65 and either through the common coil 63 or through the common coil 64 will have an amplitude three times that of the driving currents. This action will result in the selected core being switched from its minus state to its plus state. If the selected core is a core 66, it will be that core at the intersection of the one of the column coils 59–62 and the one of the row coils 51–54, to which no driving currents are applied. If the selected core is a core 67, it will be the core at the intersection of the one of the column coils 59–62 and the one of the row coils 55–58 to which no driving currents are applied.

No core in the matrix, other than the selected core, will receive M.M.F. in the plus direction. The power to switch the selected core to its plus state is divided among three of the drivers for the column coils 59–63 and three of the drivers for the row coils 51–58. Thus the drivers need only furnish 1/6 of the amount of power necessary to carry out the switching of the selected cores.

To switch the selected core back to its minus state, positive driving currents of equal amplitude are simultaneously applied to the four column coils 59–62 and either the four row coils 51–54 or the four row coils 55–58, depending upon whether the selected core is a core 66 or 67. If the selected core is a core 66, the driving currents will be applied to the row coils 55–58 and if the selected core is a core 67, the driving currents will be applied to row coils 51–54. The driving currents applied to the column coils 59–62 combine into a current having an amplitude four times that of the driving currents. This current flows through the common coil 65 to ground. The driving currents applied to row coils 51–54 or 55–58 combine into a current having an amplitude four times that of the driving currents. This current flows through the common coil 63 or the common coil 64 to ground. This action results in the selected core being switched back to its minus state.

No core in the matrix will receive M.M.F. in the plus direction during this operation. The power to switch the selected core back to its minus state is divided among drivers for four of the row coils and one of the drivers for the column coil. Thus each driver furnishes only a fraction of the power needed to switch the selected core back to its minus state.

A specific example of the operation of the matrix shown in FIGURE 2 will now be described. Suppose it is desired to select the core at the intersection of the column coil 61 and the row coil 57. Positive driving currents would then be applied simultaneously to each of the column coils 59, 60 and 62 and each of the row coils 55, 56 and 58. The magnitude of each of these driving currents shall be designated I amperes. The row coils 59, 60, and 62 will apply M.M.F. of −6I ampere turns to the cores inductively coupled thereto. The combined current flowing in common coil 65 will be 3I amperes. Therefore the common coil 65 will apply +3I ampere turns to each core in the matrix. The row coils 55, 56 and 58 will apply M.M.F. of −6I ampere turns to the cores inductively coupled thereto. The combined current flowing in common coil 64 will be 3I amperes. Therefore, the common coil 64 will apply M.M.F. of +3I ampere turns to the cores 67 and −3I ampere turns to the cores 66. The total M.M.F. applied to each core can be determined by a summation for each core of the M.M.F. applied by the various coils. Table II indicates the results of this summation.

*Table II*

| | | | |
|---|---|---|---|
| −6I | −6I | 0 | −6I |
| −6I | −6I | 0 | −6I |
| −6I | −6I | 0 | −6I |
| −6I | −6I | 0 | −6I |
| −6I | −6I | 0 | −6I |
| −6I | −6I | 0 | −6I |
| 0 | 0 | +6I | 0 |
| −6I | −6I | 0 | −6I |

In Table II the total M.M.F. applied to each core as a result of the application of the driving currents is indicated in accordance with the position of the core as illustrated in FIGURE 2. It will be observed from Table II that the only core which receives M.M.F. in the plus direction is the selected core. The selected core will receive +6I ampere turns of M.M.F. and all other cores in the matrix will either receive zero M.M.F. or −6I ampere turns. The selected core upon receiving the M.M.F. of +6I ampere turns will be switched to its plus state. The source of power to carry out this switching is divided among the drivers for the column coils 59, 60, and 62 and the row coils 55, 56, and 58.

To switch the selected core back from its plus state to its minus state, positive driving currents of I amperes are applied simultaneously to all of the column coils 59–62 and the four row coils 51–54. Each of the cores in the matrix will receive M.M.F. of −6I ampere turns from the column coils 59–62. The combined current flowing in the common coil 65 will be 4I amperes. Thus the common coil 65 will induce M.M.F. of +4I ampere turns in each of the cores of the matrix. The row coils 51–54 will apply M.M.F. of −6I ampere turns to the cores 66. The common coil 63 will have a combined current of 4I amperes flowing therein and therefore will apply an M.M.F. of +4I to each of the cores 66 and −4I ampere turns to each of the cores 67. Thus the total M.M.F. applied to each of the cores 66 will be a −4I ampere turns and the total M.M.F. applied to each of the cores 67 will be −6I ampere turns. Thus the selected core 67, receiving an M.M.F. of −6I ampere turns, will be switched back to its minus state. The power to switch the selected core is divided among the drivers for the row coils 51–54 and the driver for the column coil 61. The number of turns of the windings by which the column and row coils 51–62 are inductively coupled to the cores 66 and 67 has been described as six and the number of turns by which the common coils 63, 64 and 65 are inductively coupled to the cores 66 and 67 has been described as one, thus making a ratio of 6 to 1 between these turns. For this size matrix, this ratio should be at least 6 to 1 if half currents are to be eliminated. The minimum ratio between the turns of the row coils and common coils is determined by the size of the matrix. The formula for this minimum ratio is $(M/2)+N-2$ to 1 where M is the number of rows in the matrix and N is the number of columns in the matrix.

Figure 3:
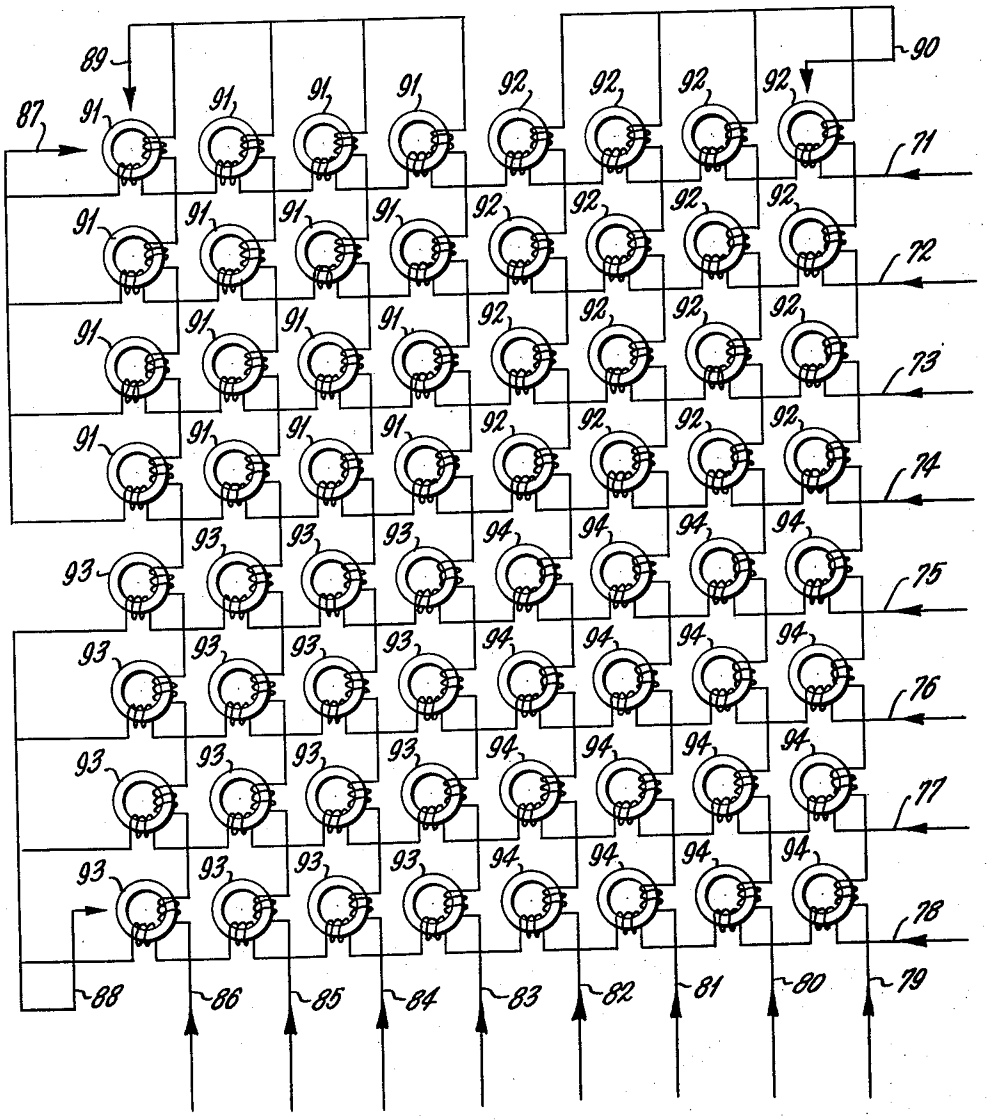
FIGURES 3 and 4 illustrate the details of a third matrix of the invention.
Figure 4:
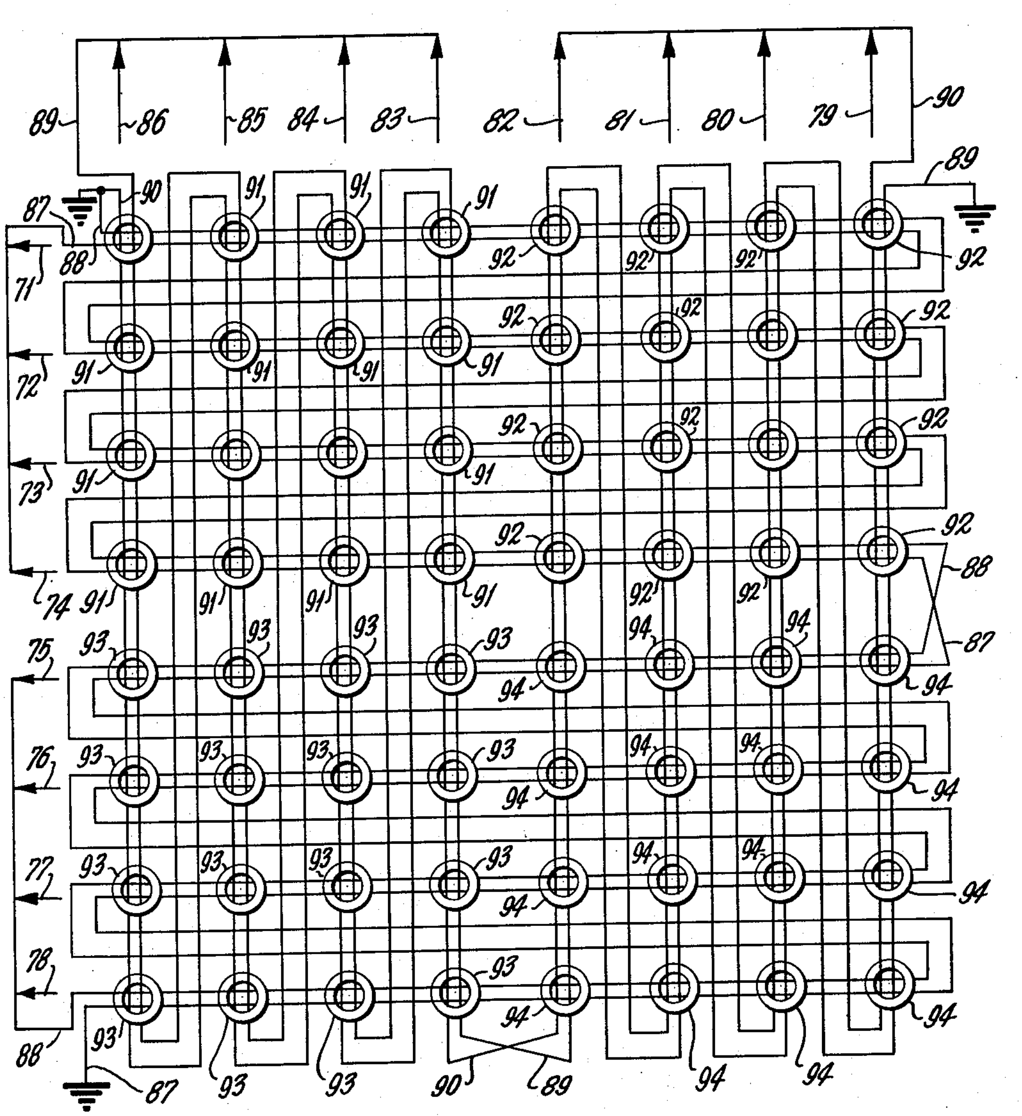

The matrix illustrated in FIGURES 3 and 4 comprises 64 cores arranged in columns of eight and rows of eight. This matrix is illustrated in two figures to decrease the complexity of the drawings. FIGURE 3 shows the row and column coils for the matrix in detail and FIGURE 4 shows the common coils of the matrix in detail. Both FIGURES 3 and 4 show how the row and column coils are connected to the common coils. The eight by eight matrix is divided into four exclusive groups of 16 cores each. Each exclusive group comprises a different quadrant of the matrix. The cores of the group in the upper left hand quadrant are designated by the number 91. The cores of the group in the upper right hand quadrant are designated by the number 92. The cores of the group in the lower left hand quadrant are designated by the number 93 and the cores of the group in the lower right hand quadrant are designated by the number 94. The matrix is provided with eight row coils 71–78, each inductively coupled to all the cores of the different row of the matrix and the matrix is provided with eight column coils 79–86, each inductively coupled to all of the cores of a different column. The row coils 71—74 are inductively coupled to the cores 91 and 92 exclusively and the row coils 75–78 are inductively coupled to the cores 93 and 94 exclusively. The column coils 79–82 are inductively coupled to the cores 92 and 94 exclusively and the column coils 83–86 are inductively coupled to the cores 91 and 93 exclusively. The narrow and column coils 71–86 are inductively coupled to the cores 91–94 by means of windings having six turns each. The polarity of these windings are such that whenever a positive current is applied to the row and column coils, an M.M.F. in the minus direction will be generated in the cores. The row coils 71–74 are connected together at one end and to a common coil 87 which is inductively coupled by a single turn to each of the cores in the matrix. The other end of the common coil 87 is connected to ground. The common coil 87 links the cores with a polarity such that when positive current flows from the common connection of the row coils 71–74 through the common coil 87 to ground, it will generate M.M.F. in the cores 91 and 92 in the plus direction, and it will generate M.M.F. in the cores 93 and 94 in the minus direction. The row coils 75–78 are connected together at one end and to a common coil 88 which links each core of the matrix with a single turn. The other end of common coil 88 is connected to ground. The common coil 88 links the cores with a polarity such that when positive current flows from the common connection of the row coils 75–78 through the common coil 88 to ground, M.M.F. will be generated in each of the cores 93 and 94 in the plus direction, and M.M.F. will be generated in each of the cores 91 and 92 in the minus direction. The column coils 79–82 are connected together at one end and to a common coil 90 which links all of the cores of the matrix with a single turn. The other end of the column coil 90 is connected to ground. The common coil 90 links the cores with a polarity such that when positive current flows from the common connection of the column coils 79–82 through the common coil 90 to ground, it will generate M.M.F. in the plus direction in the cores 92 and 94 and it will generate M.M.F. in the cores 91 and 93 in the minus direction. The column coils 83–86 are connected together at one end and to a common coil 89 which links all of the cores in the matrix with a single turn. The other end of the common coil 89 is connected to ground. The common coil 89 links each of the cores with a polarity such that when a positive current flows from the common connection of the column coils 83–86 over the common coil 89 to ground, it will generate M.M.F. in the cores 91 and 93 in the plus direction, and it will generate M.M.F. in the cores 92 and 94 in the minus direction.

In the operation of this matrix, as in the operation of the matrices shown in FIGURES 1 and 2, all of the cores in the matrix start out in their minus state. The operation of the matrix then proceeds to select one of the cores of the matrix and switch the selected core from its minus state to its plus state and then switch the selected core back to its minus state. If the selected core is one of the cores 91, then positive driving currents having equal amplitudes will be applied simultaneously to all but one of the column coils 83–86 and to all but one of the row coils 71–74. The selected core 91 is the core at the intersection of the one of the row coils 71–74 and the one of the column coils 83–86 to which driving currents are not applied. The currents applied to the column coils 83–86 will combine and flow through the common coil 89 to ground. The amplitude of the current flowing through the common coil 89 will therefore be three times that of the driving currents. The driving currents applied to the three of the row coils 71–74 will combine and flow through the common coil 87. The amplitude of this combined current therefore will also be three times that of the driving currents. This action results in the selected core 91 being switched to its plus state.

The other cores of the matrix 92, 93 and 94 are selected and switched to their plus state much in the same manner as the cores 91. If the selected core is a core 92, positive driving currents of equal amplitude are applied simultaneously to all but one of the row coils 71–74 and all but one of the column coils 79–82, and combined currents with amplitudes three times that of the driving currents will flow in common coils 87 and 90. If the selected core is a core 93, positive driving currents having equal amplitudes are simultaneously applied to all but one of the row coils 75–78 and all but one of the column coils 79–82, and combined currents having an amplitude three times that of the driving currents will flow through the common coils 88 and 90. The selected core is always that core in the selected exclusive group which is linked by column and row coils to which no driving currents are applied.

No core in the matrix, other than the selected core, will receive a total M.M.F. in the plus direction. The power to switch the selected core to its plus state is divided between three of the drivers for row coils and three of the drivers for column coils. Thus each driver need only supply ⅙ of the power necessary to switch the selected core to its plus state.

To switch a selected core 91 back to its minus state, positive driving currents of equal amplitude are applied simultaneously to the four row coils 75–78 and the four column coils 79–82. The driving currents applied to the row coils 75–78 will combine and flow through common coil 88 and the driving currents applied to the column coils 79–82 will combine and flow through common coil 90. Thus the common coils 88 and 90 will have currents flowing therein of an amplitude four times that of the driving currents. This action will cause the selected core 91 to switch back to its minus state.

When cores 92, 93 and 94 are selected they are switched back to their minus states in a similar manner. To switch a selected core 92 back to its minus state, positive driving currents of equal amplitude are simultaneously applied to row coils 75–78 and column coils 83–86 and combined currents having an amplitude of four times that of the driving currents will flow through common coils 88 and 89. To switch a selected core 93 back to its minus state, positive driving currents of equal amplitude are simultaneously applied to row coils 71–74 and and column coils 79–82 and combined currents having an amplitude four times that of the driving currents will flow through common coils 87 and 90. To switch a selected core 94 back to its minus state, positive driving currents of equal amplitude are simultaneously applied to row coils 71–74 and column coils 83–86 and combined currents having an amplitude of four times that of the driving currents will flow through common coils 87 and 89.

No core in the matrix will receive a net M.M.F. in the plus direction during this switching back operation. The power to switch the selected core back to its minus state is divided among four drivers for the row coils and four drivers for the column coils. Thus each driver need only supply ⅛ of the power to switch the selected core back to its minus state.

An example of the operation of the matrix of FIGURES 3 and 4 will now be described. In the example, the core 92 at the intersection of the row coil 73 and the column coil 81 shall be selected. To switch this core to its plus state, positive driving currents are applied simultaneously to row coils 71, 72 and 74 and to the column coils 79, 80 and 82. The amplitude of the driving currents is designated I amperes. The row coils 71, 72 and 74 will each apply M.M.F. of −6I ampere turns to the cores inductively coupled thereto and the column coils 79, 80 and 82 will apply M.M.F. of −6I ampere turns to each of the cores inductively coupled thereto. The currents applied to the row coils 71, 72 and 74 will combine and flow through the common coil 87 to ground. Thus the common coil 87 will have a current of 3I amperes flowing therein and therefore it will apply M.M.F. of +3I ampere turns to each of the cores 91 and 92 and −3I ampere turns to each of the cores 93 and 94. The currents applied to the columns 79, 80 and 82 will combine and flow through the common coil 90 to ground. As a result the common coil 90 will have a current of 3I amperes flowing therein and therefore it will apply M.M.F. of +3I ampere turns to the cores 92 and 94 and −3I ampere turns to the cores 91 and 93. The total M.M.F. applied to each core as a result of the simultaneous application of the driving currents to row coils 71, 72 and 74 and column coils 79, 80 and 82 can be determined by adding for each core the M.M.F. applied by the various coils. Table III gives the results of this summation for the example.

*Table III*

| | | | | | | | |
|---|---|---|---|---|---|---|---|
| −6I | −6I | −6I | −6I | −6I | 0 | −6I | −6I |
| −6I | −6I | −6I | −6I | −6I | 0 | −6I | −6I |
| 0 | 0 | 0 | 0 | 0 | +6I | 0 | 0 |
| −6I | −6I | −6I | −6I | −6I | 0 | −6I | −6I |
| −6I | −6I | −6I | −6I | −6I | 0 | −6I | −6I |
| −6I | −6I | −6I | −6I | −6I | 0 | −6I | −6I |
| −6I | −6I | −6I | −6I | −6I | 0 | −6I | −6I |

In Table III the M.M.F.'s are shown in accordance with the positions of the cores as illustrated in FIGURES 3 and 4. From Table III it will be observed that the only core which will receive M.M.F. in the plus direction is the selected core, which receives M.M.F. of +6I ampere turns. All other cores of the matrix either receive zero M.M.F. or −6I ampere turns of M.M.F. As a result the selected core will be switched to its plus state. The source of power for this switching is divided among the drivers for the row coils 71, 72 and 74 and column coils 79, 80 and 82.

To switch the selected core 92 of the example back to its minus state, positive driving currents will be applied simultaneously to each of the row coils 75–78 and each of the column coils 83–86. The row coils 75–78 will then apply an M.M.F. of −6I to the cores 93 and 94 and the column coils 83–86 will apply an M.M.F. of −6I ampere turns to the cores 91 and 93. The combined current of 4I amperes on the common coil 89 will apply M.M.F. of +4I to each of the cores 91 and 93 and −4I to each of the cores 92 and 94. The current of 4I amperes flowing on the common coil 88 will apply an M.M.F. of +4I ampere turns to each of the cores 93 and 94 and −4I ampere turns to each of the cores 91 and 92. Thus the total M.M.F. applied to each of the cores 91 will be −6I ampere turns, to each of the cores 92 will be −8I ampere turns, to each of the cores 93 will be −4I ampere turns, and to each of the cores 94 will be −6I ampere turns. Thus the selected core 92 will be switched back to its minus state. The source of power for this switching is divided among the drivers for the row coils 75–78 and column coils 83–86.

In the matrix of FIGURES 3 and 4, the number of turns by which the row and column coils are inductively coupled to the cores has been described as 6, and the number of turns by which the common coils are inductively coupled to the cores has been described as 1, this making a ratio of 6 to 1 between the turns of these windings. If half currents are to be eliminated this ratio must be at least 6 to 1 for this specific matrix. The minimum ratio is determined by the size of the matrix. The formula to this minimum ratio for the matrix of FIGURES 3 and 4 is $[(M+N)/2]-2$, in which M is the number of rows of the matrix and N is the number of columns of the matrix.

In the above description, the matrices of FIGURES 1 and 2 have been described as having oblong shapes and the matrix of FIGURES 3 and 4 has been described as square. These shapes were chosen because they are the easiest to illustrate. It is obvious, however, that the matrices of FIGURES 1 and 2 could be square or that the matrix of FIGURES 3 and 4 may be oblong shapes as the number of rows and columns may or may not be equal. The most efficient matrix, from the standpoint of getting the most number of outputs from the fewest number of inputs, is one in which the numbers of rows and columns are equal.

In the above description, the matrices of this invention have been described as being arranged in columns and rows. Of course, the matrices do not need to have this physical arrangement. Accordingly, the term "electrically arranged" as used in the claims refers only to the electrical circuit of the arrangement and does not define a physical arrangement.

In the operation of the above described matrices, positive driving currents are used. Negative driving currents may be used for some or all of the row and column coils, but the polarities of the windings must be adjusted accordingly.

The above description is of specific embodiments of the invention and many modifications may be made thereto without departing from the spirit and scope of the invention, which is limited only as defined in the appended claims.

What is claimed is:

1. A magnetic switching core matrix comprising a multiplicity of magnetic cores having two stable states of magnetization electrically arranged in columns and rows, a plurality of column coils each inductively coupled to a different column of said cores, a plurality of row coils each inductively coupled to a different row of said cores, said row coils being divided into first and second exclusive groups, first and second common coils each inductively coupled to all of said cores, first means connecting one set of ends of said row coils of said first exclusive group in parallel circuit with one end of said first common coil, and second means isolated from said first means connecting one set of ends of said row coils of said second exclusive group in parallel circuit with one end of said second common coil.

2. A magnetic switching core matrix comprising a multiplicity of magnetic cores having two stable states of magnetization electrically arranged in the columns and rows, a plurality of column coils each inductively coupled to a different column of said cores, a plurality of row coils each inductively coupled to a different row of said cores, said row coils being divided into first and second exclusive groups, first, second, and third common coils each inductively coupled to all of said cores, first means connecting on set of ends of said row coils of said first exclusive group in parallel circuit with one end of said first common coil, second means isolated from said first means connecting one set of said row coils of said second exclusive group in parallel circuit with one end of said second common coil, and third means isolated from said first and second means connecting one set of said column coils in parallel circuit at one end and to one end of said third common coil.

3. A magnetic switching core matrix comprising a multiplicity of magnetic cores having two stable states of magnetization electrically arranged in columns and rows, a plurality of column coils each inductively coupled to a different column of said cores, said column coils being divided into first and second exclusive groups, a plurality of row coils each inductively coupled to a different row of said cores, said row coils being divided into first and second exclusive groups, first, second, third and fourth common coils each inductively coupled to all of the cores, first means connecting one set of ends of said row coils of said first exclusive group in parallel circuit with one end of said first common coil, second means isolated from said first means connecting one set of ends of said row coils of said second exclusive group in parallel circuit with one end of said second common coil, third means isolated from said first and second means connecting one set of said column coils of said first exclusive group in parallel circuit at one end and to one end of said third common coil, and fourth means isolated from said first, second and third means connecting one set of said column coils of said second exclusive group in parallel circuit at one end and to one end of said fourth common coil.

4. A magnetic switching core matrix comprising a multiplicity of magnetic cores having two stable states of magnetization electrically arranged in columns and rows, a plurality of column coils each inductively coupled to a different column of said cores, a plurality of row coils each inductively coupled to a different row of said cores, said row coils being divided into first and second exclusive groups, first and second common coils each inductively coupled to all of said cores, first means connecting one set of ends of said row coils of said first exclusive group in parallel circuit with one end of said first common coil, second means isolated from said first means connecting one set of ends of said row coils of said second exclusive group in parallel circuit with one end of said second common coil, third means connecting the other end of each of said first and second common coils to a reference potential, and fourth means connecting one end of each of said column coils to a reference potential.

5. A magnetic switching core matrix comprising a multiplicity of magnetic cores having two stable states of magnetization electrically arranged in columns and rows, a plurality of column coils each inductively coupled to a different column of said cores, a plurality of row coils each inductively coupled to a different row of said cores, said row coils being divided into first and second exclusive groups, first, second, and third common coils each inductively coupled to all of said cores, first means connecting one set of ends of said row coils of said first exclusive group in parallel circuit with one end of said first common coil, second means isolated from said first means connecting one set of ends of said row coils of said second exclusive group in parallel circuit with one end of said second common coil, third means isolated from said first and second means connecting one set of said column coils in parallel circuit at one end and to one end of said third common coil, and fourth means connecting the other end of each of said first, second and third common coils to a reference potential.

6. A magnetic switching core matrix comprising a multiplicity of magnetic cores having two stable states of magnetization electrically arranged in columns and rows, a plurality of column coils each inductively coupled to a different column of said cores, said column coils being divided into first and second exclusive groups, a plurality of row coils each inductively coupled to a different row of said cores, said row coils being divided into first and second exclusive groups, first, second, third and fourth common coils each inductively coupled to all of said cores, first means connecting one set of ends of said row coils of said first exclusive group in parallel circuit with one end of said first common coil, second means isolated from said first means connecting one set of ends of said row coils of said second exclusive group in parallel circuit with one end of said second common coil, third means isolated from said first and second means connecting one set of said column coils of said first exclusive group in parallel circuit at one end and to one end of said third common coil, fourth means isolated from said first, second and third means connecting one set of said column coils of said second exclusive group in parallel circuit at one end and to one end of said fourth common coil, and fifth means connecting the other ends of each of said first, second, third and fourth common coils to a reference potential.

7. A magnetic switching core matrix comprising a multiplicity of magnetic cores having two stable states of magnetization electrically arranged in columns and rows, a plurality of column coils each inductively coupled to a different column of said cores, a plurality of row coils each inductively coupled to a different row of said cores, said row coils being divided into first and second exclusive groups, first and second common coils each inductively coupled to all of said cores, means for applying to said first common coil simultaneously with the application of currents to said row coils of said first exclusive group, a current having an amplitude equal to the sum of the currents simultaneously applied to said row coils of said first exclusive group, and means for applying to said second common coil simultaneously with the application of currents to said row coils of said second exclusive group a current having an amplitude equal to the sum of the currents simultaneously applied to said row coils of said second exclusive group.

8. A magnetic switching core matrix comprising a multiplicity of magnetic cores having two stable states of magnetization electrically arranged in columns and rows, a plurality of column coils each inductively coupled to a different column of said cores, a plurality of row coils each inductively coupled to a different row of said cores, said row coils being divided into first and second exclusive groups, first, second and third common coils each inductively coupled to all of said cores, means for applying to said first common coil simultaneously with the application of currents to said row coils of said first exclusive group a current having an amplitude equal to the sum of the currents simultaneously applied to said row coils of said first exclusive group, means for applying to said second common coil simultaneously with the application of currents to said row coils of said second exclusive group a current having an amplitude equal to the sum of the currents simultaneously applied to said row coils of said second exclusive group, and means for applying to said third common coil simultaneously with the application of currents to said column coils a current having an amplitude equal to the sum of the currents simultaneously applied to said column coils.

9. A magnetic switching core matrix comprising a multiplicity of magnetic cores having two stable states of magnetization electrically arranged in columns and rows, a plurality of column coils each inductively coupled to a different column of said cores, said column coils being divided into first and second exclusive groups, a plurality of row coils each inductively coupled to a different row of said cores, said row coils being divided into first and second exclusive groups, first, second, third and fourth common coils each inductively coupled to all of said cores, means for applying to said first common coil simultaneously with the application of currents to said row coils of said first exclusive group a current having an amplitude equal to the sum of the currents simultaneously applied to said row coils of said first exclusive group, means for applying to said second common coil simultaneously with the application of currents to said row coils of said second exclusive group a current having an amplitude equal to the sum of the currents simultaneously applied to said row coils of said second exclusive group, means for applying to said third common coil simultaneously with the application of currents to said column coils of said first exclusive group a current having an amplitude equal to the sum of the currents simultaneously applied to said column coils of said first exclusive group, and means for applying to said fourth common coil simultaneously with the application of currents to said column coils of said second exclusive group a current having an amplitude equal to the sum of the currents simultaneously applied to said column coils of said second exclusive group.

References Cited in the file of this patent

UNITED STATES PATENTS 2,964,737 Christopherson ---------- Dec. 13, 1960